July 29, 1969  L. W. WELLS  3,458,157
FILM CARTRIDGE

Filed March 7, 1967

INVENTOR.
LEON W. WELLS
BY
Lyon & Lyon
ATTORNEYS

INVENTOR.
LEON W. WELLS
BY
Lyon & Lyon
ATTORNEYS

United States Patent Office 3,458,157
Patented July 29, 1969

3,458,157
FILM CARTRIDGE
Leon W. Wells, Closter, N.J., assignor to Panopix Research Inc., New York, N.Y., a corporation of New York
Filed Mar. 7, 1967, Ser. No. 621,259
Int. Cl. G11b 15/32
U.S. Cl. 242—188                                     4 Claims

ABSTRACT OF THE DISCLOSURE

A cartridge for film having; a reel journalled therein, a means on the reel to drivingly connect it to an external driver; a slotted movable gate through which the film is guided and so shaped that the recording on the film will not be scratched, the film being adapted to move the gate to actuate a projector-controlling switch at the end of a projection cycle; and a guide roller against which the film can be pressed by an external friction drive for automatic threading in a projection machine.

CROSS REFERENCE TO RELATED APPLICATIONS

The present invention is for film of the type shown and claimed in my copending application Ser. No. 619,499, filed Feb. 6, 1967, for Motion Picture Film and is for use with a projector of the general type disclosed in my copending application Ser. No. 541,196, filed Apr. 8, 1966, entitled Improved Projector.

BACKGROUND OF THE INVENTION

My prior application No. 541,196 describes a projector for receiving a cartridge of film, automatically threading the film, sequentially projecting a multiplicity of rows of picture frames depicting a continuing action sequence, then withdrawing the film into the cartridge, and stopping the machine. The film cartridge described in that application was adapted for use only with the specific projector shown whereas the present invention comprises a modified cartridge adapted for use with a similar but modified and simplified projector.

SUMMARY OF THE INVENTION

This improved film cartridge comprises, generally, a casing having a film reel journalled therein with portions exposed for driving connection to an external rotary member. Guide means direct the film from the reel, around a guide roller, then through a slot in a movable gate to the exterior of the cartridge casing. The outer end of the film has a stop means thereon engageable with the slotted gate to move the latter and shut off the projector when the outer end of the film reaches the gate at the end of a projection cycle. The casing has openings opposite the guide roller to permit positioning drive wheels therein far enough to engage the edge portions of film at said guide roller and thereby move the film out of the cartridge and automatically thread it through the projector. The slot in the gate is configured to engage and guide only the edge portions of the film to thus avoid scratching any images or the like on the film.

DESCRIPTION OF THE PREFERRED EMBODIMENT

Figures 1, 2:
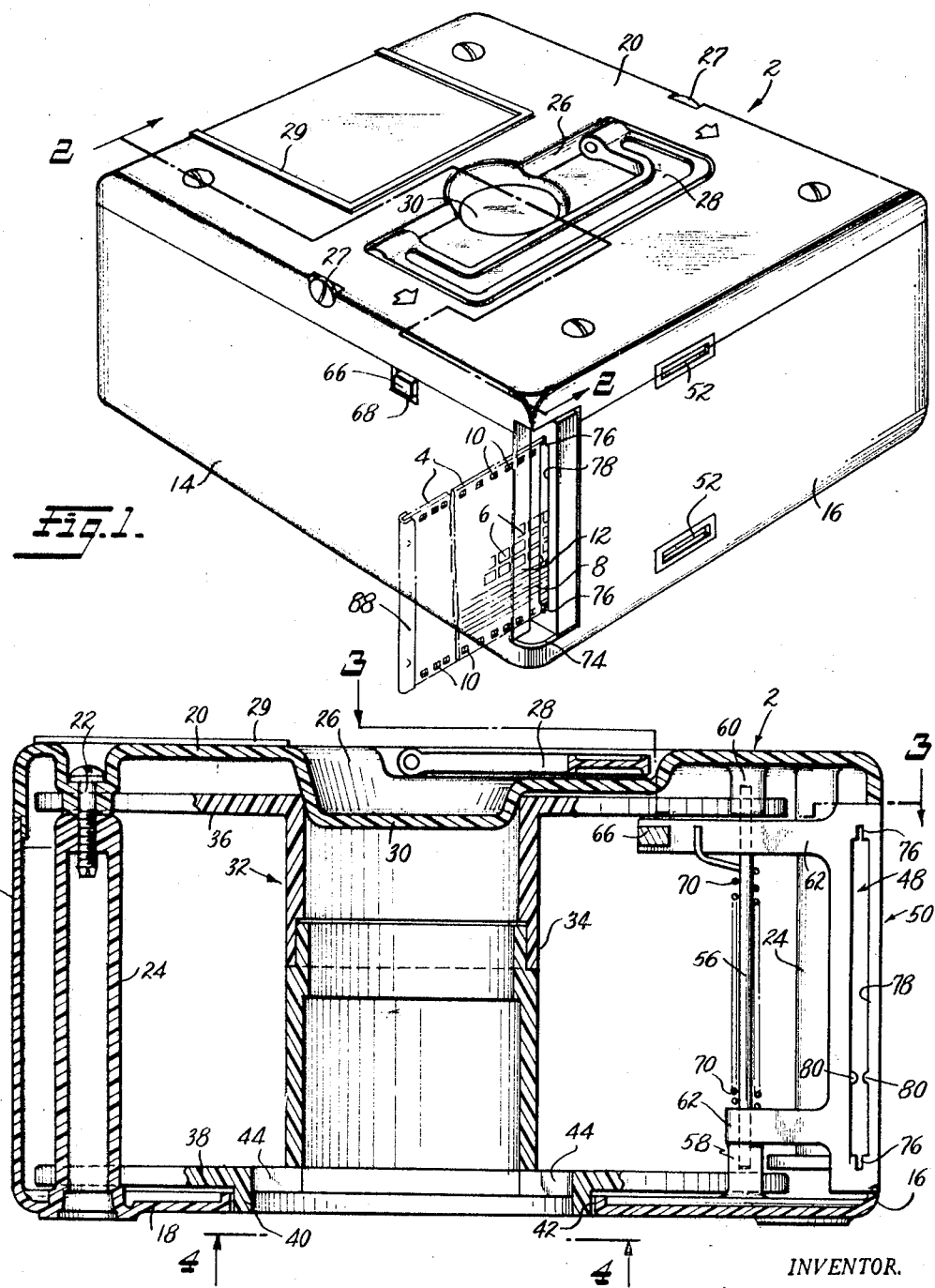
FIG. 1 is a perspective view of a film cartridge embodying the present invention.
FIG. 2 is an enlarged vertical sectional view taken along the line 2—2 of FIG. 1.

The perspective view of FIG. 1 shows the cartridge 2 of the present invention and by dotted line there is shown a portion of a length of film 4 projecting therefrom.

The cartridge is intended for use with film of the type fully disclosed and claimed in my copending application Ser. No. 619,499, filed Feb. 6, 1967. As disclosed therein, the film is a wide film, for example, about 70 mm. in width and is provided with a multiplicity of adjacent longitudinal rows 6 of picture frames thereon depicting a continuous action sequence and extending from one edge of the film inwardly. Adjacent the opposite edge of the film is a multiplicity of sound tracks 8, there being one corresponding to each of the rows of picture frames 6. The film is provided with the usual perforations 10 only at its opposite edges. Between the rows of picture frames 6 and the sound tracks 8 is a narrow strip 12 of film having nothing recorded thereon. Reference will be made to this strip later.

As fully described in my prior application Ser. No. 541,196, filed Apr. 8, 1966, the film employed is projected in a machine adapted to receive the cartridge on a vertically movable platform. The machine is provided with roller means for automatically withdrawing film from the cartridge, threading it through the machine, then sequentially projecting rows of picture frames, by reversing the direction of film drive between rows and moving the platform vertically to position successive rows in positions to be projected on a fixed screen. It will not be necessary to describe the machine in further detail since the basic projection structure is fully disclosed in said prior application.

The cartridge of the present invention comprises a molded or otherwise formed container having side walls 14 and 16, a bottom wall 18 and a removable cover 20 defining a top wall for the cartridge. The cover 20 is secured in place on the container by means of screws 22 engaging upstanding hollow posts 24 adjacents the corners of the container portion. The cover 20 is provided with a well or recess 26 in which a suitable handle 28 is pivotally mounted by means of screws 27 in a manner that will be clearly obvious from the drawings. A suitable label holder 29 is also shown on the cover 20.

A hollow boss 30 depends from the cover 20 and constitutes a centering and journalling means for a film reel 32 having a hollow cylindrical hub portion 34, an upper flange 36 and a lower flange 38. The upper end of the hollow hub 34 embraces the boss 30 fairly loosely so that it is free to turn thereon. An annular boss 40 depends from the hub 34 or lower flange 38, concentric to the hollow hub 34 and is loosely journalled in a circular opening 42 in the bottom wall 18 of the cartridge concentric to the boss 30. Thus, the reel is supported by the bottom wall 18 but is held centered and journalled for rotation by the opening 42 and the boss 30. As previously indicated, the cartridge is intended to be received on a projection machine and that machine is provided with a reel-driving rotary member having a portion extendible into the hollow interior of the hub 34 and keying or driving means engageable with opposed notches 44 at the lower end of the hub 34 and which actually extend outwardly into the flange 38. It is, of course, intended that a length of the film 4 will be secured at its inner end to the hub of the reel 32 so that it can be unwound from and rewound on the reel.

Figure 3:
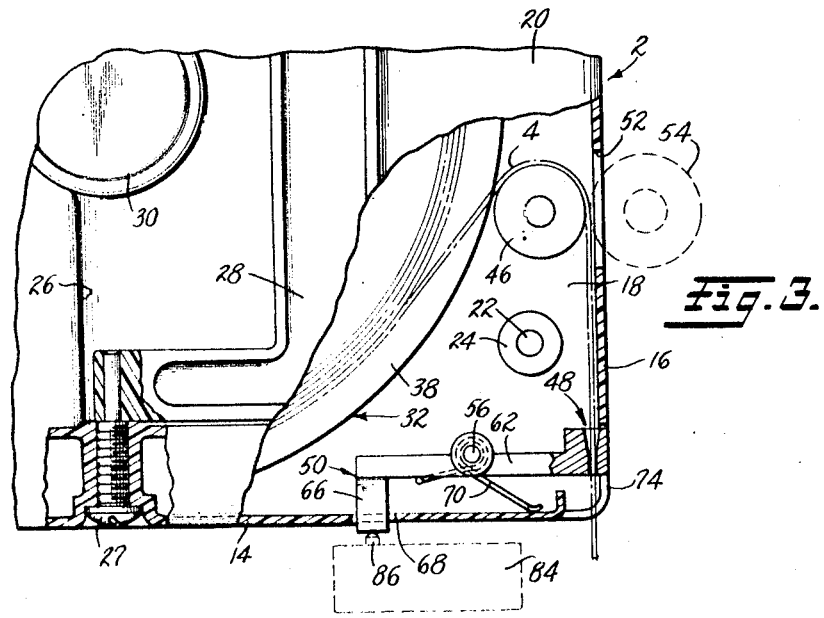
FIG. 3 is a horizontal sectional view taken along the line 3—3 of FIG. 2.
Figure 4:
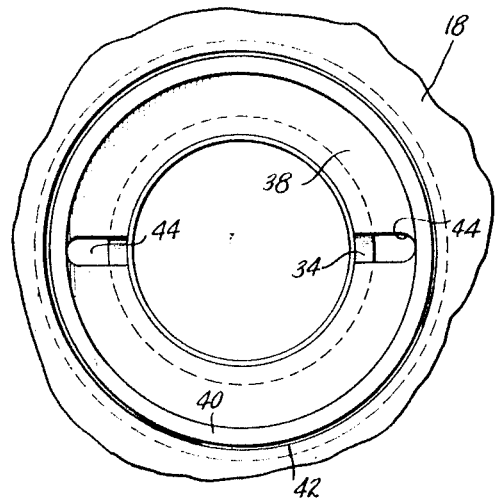
FIG. 4 is a fragmentary view of a portion of FIG. 2, as seen along the line 4—4 of FIG. 2.
Figure 5:
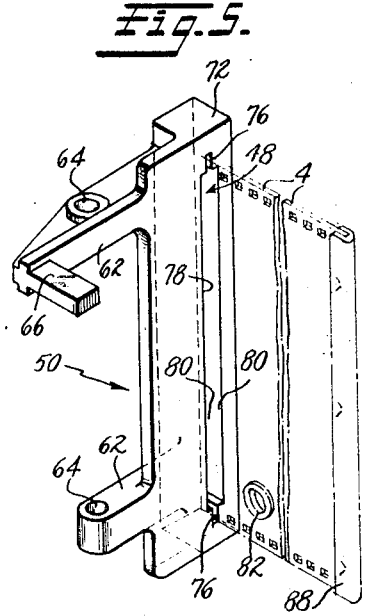
FIG. 5 is a perspective view of the pivoted gate.

Referring now to FIG. 3, the film 4 is guided from the reel 32 along a predetermined path extending around a guide roller 46 journalled in the cartridge but spaced slightly from the side wall 16. As shown in FIG. 3, the film is guided around the guide roller 46, thence along the inner surface of the wall 16, but spaced therefrom, and through a slot 48 in a pivoted gate 50. The wall 16 of the cartridge is provided with a pair of elongated slots 52 directly opposite the end portions of the guide roller 46 and through which friction rollers 54 (only one being shown in phantom lines in FIG. 3) can be positioned to frictionally engage the perforated edge portions of the film 4 and press the same against roller 46 whereby rotation of the rollers 54 in a counterclockwise direction, as seen in FIG. 3, will draw film 4 from the reel 32 and project the same outwardly of the cartridge through the guide slot 48 for automatic threading of the film in the projection machine. The pivoted gate 50 is pivotally mounted in the cartridge 2 on a pin 56 supported in a boss 58 on the bottom wall 18 and extending into a boss 60 depending from the cover 20. The pivoted gate is provided with a pair of arms 62 (see also FIGS. 2 and 5) each being provided with an opening 64 to receive the pivot pin 56. The upper arm 62 extends beyond the pivot pin and terminates in a laterally extending finger or projection 66 normally extending toward and partially through an opening 68 in the side wall 14 of the cartraidge. A suitable torsion spring 70 surrounds the pin 56 and bears at one end of the upper arm 62 and at its lower end against the inner face of side wall 14 to thus bias the gate to rotate in a clockwise direction as viewed in FIG. 3. The portion of the gate 50 through which the slot 48 extends is in the form of a vertical bar 72 carried by the arms 62 and aligned with an opening or slot 74 formed in one corner of the cartridge in portions of side walls 14 and 16. FIGS. 2 and 5 clearly show the shape of the slot 48 and show that it is an elongated slot having narrow end portions 76 and a wider intermediate portion 78. As indicated in FIG. 5, the narrow end portions 76 embrace and guide only the opposite edge portions of the film 4 and thus guidingly engage only that portion of the film containing the perforations 10. The intermediate portions of the film 4, which contain the recorded information, referred to as the rows of picture frames and the sound tracks, passes through the wider intermediate portion 78 of the slot without engaging the sides thereof and thus the images on the film are protected from abrasion while moving through the slot 48. As previously indicated, there is a narrow strip 12 on the film 4 having no information recorded thereon and which is intermediate the picture frames and the sound strips. The sides of the slot 48 are provided with rounded opposed projections 80 on opposite sides thereof and aligned with the clear or bare strip 12 so that the film may engage those projections for guiding movement while still holding the strips containing recorded information away from the sides of the slot 48. When transporting or projecting film of the width contemplated by this invention, it is always possible and sometimes likely that the film will tend to buckle or curl laterally. The projections 80 ensure that any tendency of the film to buckle will be resisted sufficiently to prevent abrasion of the faces thereof against the sides of the slot 48.

As disclosed in my copending application Ser. No. 541,196, the projection machine is automatically operable and is provided with means to detect the ends of the sound tracks 8 to effect reversal of film drive under certain conditions and that safety means comprises an eyelet 82 (FIG. 5) engageable with a switch on the machine (not shown). As is clearly evident from FIG. 5, the eyelet 82 can pass freely through the wider intermediate portion 78 of the slot 48 without interference and without pivoting the gate 50. The machine described in the aforementioned copending application is also provided with switch means to effect pulling down of the projection platform after the film has been completely projected and automatically withdrawn back into the cartridge. A suitable switch is shown in phantom line at 84 in FIG. 3 and is provided withan actuator button 86 positioned adjacent and facing the outer end of the finger 66 on gate 50. It is to be noted, however, that the spring 70 holds the finger 66 retracted during normal projection sequences when the film 4 is merely moving through the slot 48 in one direction or another. After the last row of picture frames has been projected, the machine does not reverse the direction of drive since the film is at that time being wound on the cartridge reel 32 and the drive continues to wind the film, withdrawing the same from the transport and projection portions of the machine until the outer end thereof has reached the cartridge. The outer end of the film 4 is provided with a transverse bar or stop member in the form of a channel-shaped metal strip 88 affixed to the outer end thereof. The strip 88 extends from edge-to-edge of the film and the total width thereof is too great to pass through the narrow end portions 76 of slot 48 so that when the film is completely retracted from the projection machine, the strip 88 engages the sides of the slot 48, adjacent the ends thereof, and the tension on the film causes the gate 50 to swing counterclockwise, as seen in FIG. 3, against the action of spring 70. This movement causes the finger 66 to move outwardly through opening 68 and actuate the switch 84 for effecting terminal cycling of the projection machine, that is, stopping the reel drive and pulling the platform on which the cartridge is mounted down into its starting position and thereafter shutting off the machine. After the machine is shut off, slight tension is maintained on the film 4 until the cartridge has been removed from the projection machine.

I claim:

1. A film cartridge comprising: a casing having a reel journalled therein; a movable gate on said casing and having film guiding means for guiding film between said reel and the exterior of said casing; a length of film wound on said reel and extending through said film guiding means; a switch actuator on said gate adjacent said film guiding means; means biasing said gate for movement in one direction; and stop means on said film, outwardly of said gate, engageable with said film guiding means to move said gate and switch actuator in response to predetermined movement of said film inwardly of said casing.

2. A film cartridge as defined in claim 1 wherein said film guiding means comprises an elongated slot in said gate, said slot having relatively narrow ends embracing and guiding only the opposite edge portions of said film and having a wider intermediate portion, said stop means comprising at least one projection engageable with said gate adjacent said slot.

3. A film cartridge as defined in claim 2 wherein said stop means comprises a substantially rigid bar-like member extending across and secured to the outer end of said film.

4. A film cartridge as defined in claim 2 wherein said film has optically recorded information thereon only between said edge portions and arranged in at least two longitudinally extending spaced apart strips; a pair of opposed projections extending inwardly from opposed sides of said slot intermediate the ends of said wider intermediate portion thereof and positioned to engage and guide said film in the space between said strips whereby to prevent lateral buckling of said film in said slot.

References Cited

UNITED STATES PATENTS

| | | | |
|---|---|---|---|
| 1,078,861 | 11/1913 | Koch | 242—57 X |
| 2,153,573 | 4/1939 | Kinloch | 242—71.1 |
| 2,213,776 | 9/1940 | Walter | 242—71.1 |
| 2,578,283 | 12/1951 | Bornemann et al. | 242—74 |
| 2,821,576 | 1/1958 | Gaubert. | |
| 2,988,954 | 6/1961 | Kuhnert et al. | 242—55.13 X |
| 3,090,574 | 5/1963 | Doncaster et al. | 242—71.1 X |
| 3,105,645 | 10/1963 | Rost. | |
| 3,150,840 | 9/1964 | Briskin et al. | |
| 3,323,744 | 6/1967 | Chesley et al. | 242—71.1 |

GEORGE F. MAUTZ, Primary Examiner

U.S. Cl. X.R.

242—57